United States Patent [19]

Kamata

[11] Patent Number: 5,521,669
[45] Date of Patent: May 28, 1996

[54] FRAME POSITIONING AND SHUTTER COCKING MECHANISM

[75] Inventor: Kazuo Kamata, Kanagawa, Japan

[73] Assignee: Fuji Photo Film Co., Ltd., Kanagawa, Japan

[21] Appl. No.: 271,622

[22] Filed: Jul. 7, 1994

[30] Foreign Application Priority Data

Jul. 8, 1993 [JP] Japan .................................. 5-169275

[51] Int. Cl.⁶ ........................................... G03B 17/42
[52] U.S. Cl. .............................. 354/204; 354/206
[58] Field of Search ............................ 354/204, 206, 354/203, 213

[56] References Cited

U.S. PATENT DOCUMENTS

| | | |
|---|---|---|
| 3,906,530 | 9/1975 | Oshima . |
| 4,290,676 | 9/1981 | Hozman et al. . |
| 5,187,518 | 2/1993 | Kitagawa . |

FOREIGN PATENT DOCUMENTS 63-51329  4/1988  Japan .
3-179442  8/1991  Japan .

*Primary Examiner*—Monroe H. Hayes
*Attorney, Agent, or Firm*—Young & Thompson

[57] ABSTRACT

A mechanism for cocking a shutter actuating lever during the one-frame advance of a photographic film having one or two perforations per frame. A cocking lever pushes the shutter actuating lever toward a cocked position when a claw lever mounted on a distal end of the cocking lever is engaged in one of the perforations along with advancing of the photographic film. When the shutter actuating lever reaches the cocked position, an arresting lever is rotated into an anti-winding position wherein the arresting lever arrests the shutter actuating lever in the cocked position and, simultaneously, engages with a film winding wheel to stop film advancing. The arresting lever is connected to the claw lever through the cocking lever so as to cause the claw lever to remove from the perforation when the arresting lever rotates into the anti-winding position. A film securing member cooperates with the arresting lever to secure the photographic film after the claw lever is removed from the perforation until the shutter actuating lever is released.

12 Claims, 15 Drawing Sheets

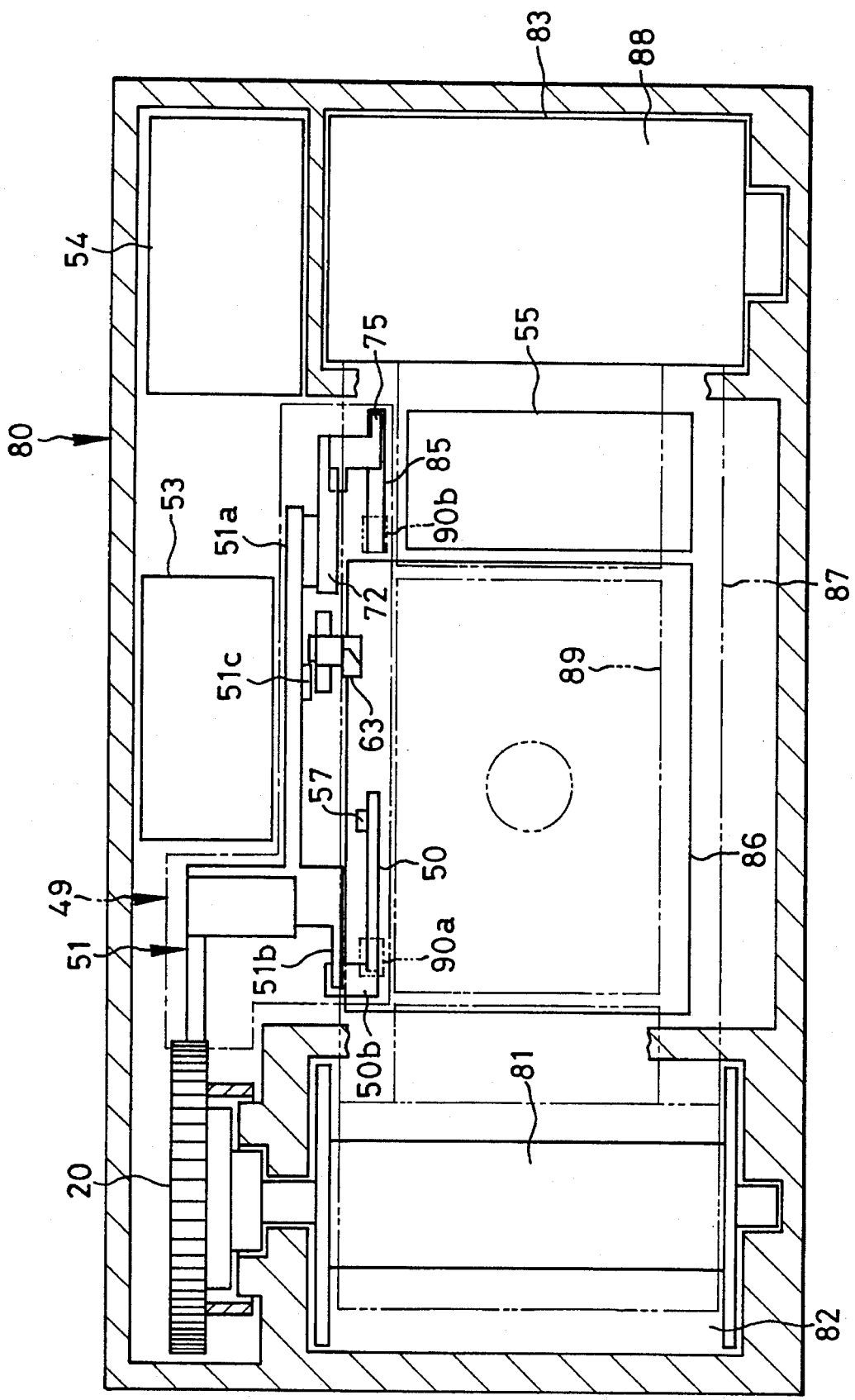

FRAME POSITIONING AND SHUTTER COCKING MECHANISM

BACKGROUND OF THE INVENTION

1. Field of the Invention

The present invention relates to a mechanism for seriatim positioning each frame of a photographic film in an exposure position behind an exposure aperture by advancing the photographic film by one-frame amount and for cocking a shutter actuating member during the one-frame advance of the photographic film, wherein the photographic film has one or two perforations per frame which are brought into engagement with the mechanism for the positioning and/or cocking.

2. Related Art

A photographic film has been known, for example, from JPA 3-179442, that is provided with magnetic recording tracks and has only one or two perforations per frame so as to permit efficient recording of data on the recording tracks outside the frames.

For use with such a photographic film, it is convenient to detect the perforation by a photo-sensor for controlling a motor to advance the photographic film by one-frame amount, and to cock the shutter by the power of the motor. However, to use such a photographic film in a low-price camera or a lens-fitted photographic film unit such as called "Quick Snap" (a trade name), for instance, because the cost of these article must be lower, it is unreasonable to mount the photographic sensor and the motor therein. In this case, it is necessary to mechanically detect the position of the perforations, mechanically advance the photographic film and mechanically cock the shutter.

As an example of those cameras which are loaded with photographic film having a perforation per frame, 110 camera using 110 film cartridge has been known. Also a lens-fitted photographic film unit, hereinafter referred to as film unit, which is pre-loaded with a 110 film cartridge is disclosed in JPU 63-51329. A conventional frame positioning and shutter cocking mechanism used in the conventional 110 camera or the 110 type film unit, has an arresting claw which is biased toward the film in a substantially perpendicular direction to the film surface. When the film is advanced by winding up the film to move the perforation in front of the arresting claw, the arresting claw is jumped into the perforation. Further film advance causes the arresting claw to move along with the film in a substantially rectilinear direction, thereby cocking the shutter.

The arresting claw is stopped against a stop pin at a predetermined position where the arresting claw still engages with the perforation. As a result, the film advance and the film winding is hindered. When a shutter release button is depressed, the arresting claw is disengaged from the perforation in the substantially perpendicular direction and, immediately thereafter, a shutter blade is actuated to make an exposure. When the shutter release button is returned to an initial position, the arresting claw is pressed onto the film surface under the biasing force, thereby the mechanism being ready for the next frame positioning and shutter cocking operation.

As described above, the arresting claw of the conventional frame positioning and shutter cocking mechanism always moves substantially linearly, that is, perpendicularly to the film surface when pressed onto and removed from the film surface, and along a straight film advancing path during clocking the shutter.

However, because it is necessary to keep engagement between the arresting claw and the perforation throughout the shutter cocking operation, the conventional frame positioning and shutter cocking mechanism is hardly applicable to such a film unit like as "Quick Snap" that makes the film surface concave about the exposure position. In that case, the arresting claw would slip off the perforation during the shutter cocking. Even after the shutter cocking, if the arresting claw should slip off the perforation before the shutter release, the photographic film would be vibrated by the shutter release operation, which could result in taking a duplicate or blurred picture.

Moreover, because the conventional mechanism requires a large number of parts including a lot of sliding member and a complicated mechanism for actuating the arresting claw, it would make it difficult to automatically assemble the film unit and thus increase the cost of the film unit.

SUMMARY OF THE INVENTION

In view of the foregoing, an object of the present invention is to provide a frame positioning and shutter cocking mechanism, which may be manufactured at a low cost, and has a simple construction, but reliably cocks a shutter actuating member during one-frame advance of a photographic film having one or two perforations per frame, and is applicable to a camera or a film unit having a concave film surface about an exposure position, as well.

Another object of the present invention is to provide a frame positioning and shutter cocking mechanism, which secures a photographic film after the cocking before the release of the shutter actuating member.

To achieve the above and other objects, according to the present invention, a shutter actuating lever is moved to a cocked position through a cocking lever having a claw member mounted on a distal end thereof, such that one end of the cocking lever pushes the shutter actuating lever toward the cocked position along with the advance of the photographic film after the claw member is engaged in one of the perforations of the photographic film. When the shutter actuating lever reaches the cocked position, an arresting lever arrests the shutter actuating lever in the cocked position and, simultaneously therewith, engages with a film winding wheel to stop film advancing. The arresting lever is connected to the claw member through a cocking lever so as to cause the claw member to remove from the perforation when the arresting lever rotates to arrest the shutter actuating lever in the cocked position.

According to a preferred embodiment of the invention, a friction member is secured to the arresting lever. While the arresting lever arrests the shutter actuating lever, the friction member is brought into contact with the film surface to prevent the photographic film from fluttering during the exposure.

According to another preferred embodiment, an engaging member is provided in cooperation with the arresting lever. When the arresting lever rotates to arrest the shutter actuating lever in the cocked position, one end of the arresting lever pushes the engaging member to engage in another one of the perforations which is adjacent to the perforation in which the claw member was engaged. This embodiment is effective to prevent the photographic film from fluttering during the exposure and position each frame exactly in a predetermined exposure position behind an exposure aperture.

The claw member is preferably disposed between an exposure chamber and a film supply chamber or a film take-up chamber. This construction facilitates to shield the photographic film from extraneous light which might enter through a gap necessary for the interconnection between the members of the frame positioning and shutter cocking mechanism. On the contrary, if the claw member were disposed in the place of a conventional sprocket wheel, it would be difficult to shield the photographic film from extraneous light.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 15 is a diagram showing a layout of another camera having the frame positioning and shutter cocking mechanism of FIG. 9 mounted therein, wherein photographic film is wound up from a cassette onto a take-up spool one frame after each exposure.

DETAILED DESCRIPTION OF THE PREFERRED EMBODIMENT

Figure 1:
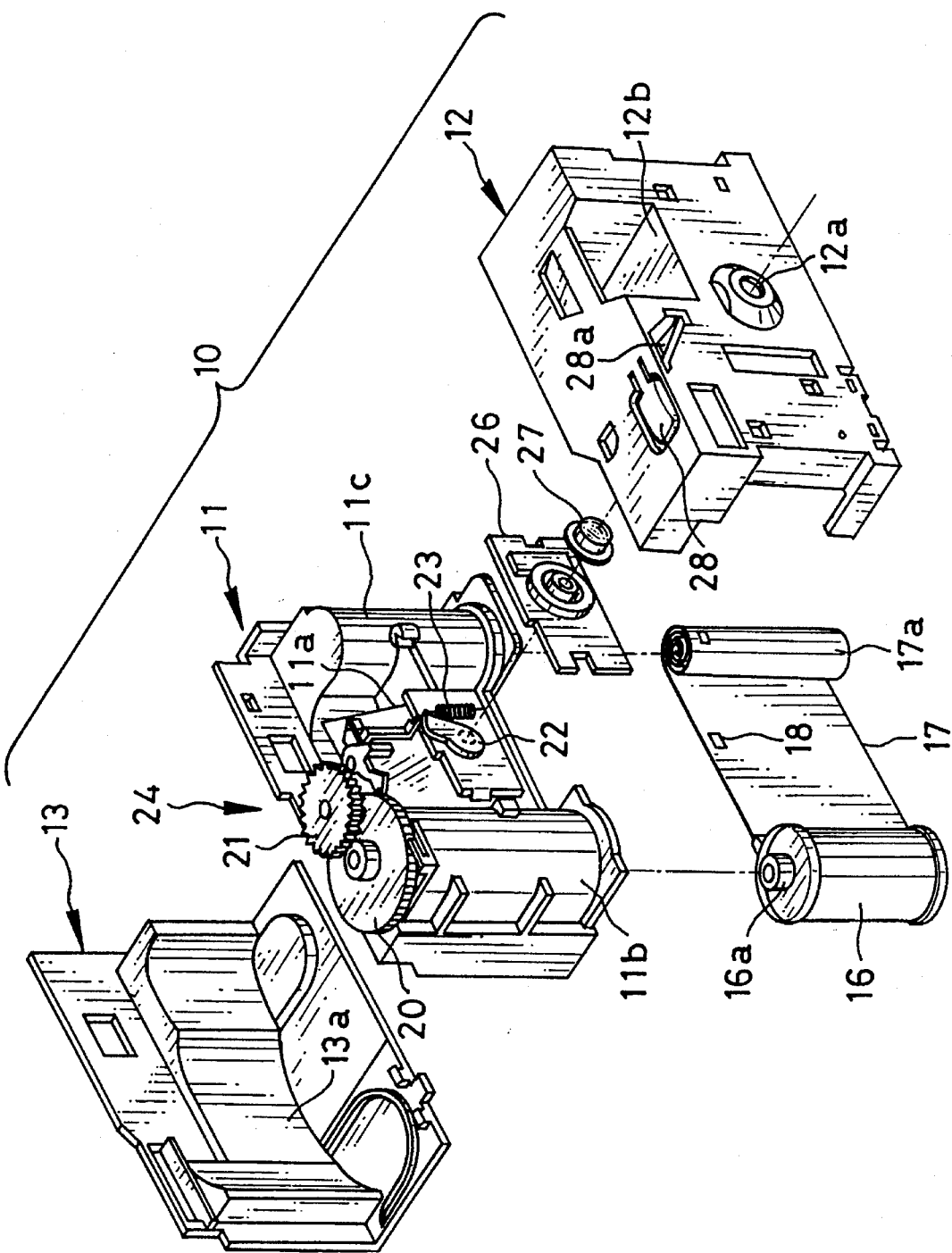
FIG. 1 is an exploded perspective view of a lens-fitted photographic film unit having a frame positioning and shutter cocking mechanism of the present invention.

Referring to FIG. 1, a unit housing 10 of a film unit is constituted of a main body 11, a front cover 12 and a rear cover 13. The main body 11 includes an exposure chamber 11a and cassette and film roll chambers 11b and 11c disposed on opposite sides of the exposure chamber 11a. The cassette chamber holds a cassette 16 and the film roll chamber 11c holds a roll 17a of unexposed photographic film 17 drawn from the cassette 16 and rewound into the roll. The photographic film 17 has a perforation 18 per frame which is formed along a side edge of the film. For example, the perforation 18 has a length of 3 mm in the film advancing direction or film longitudinal direction. The unit housing 10 is practically encased in a cardboard box or the like which has cutouts for allowing to operate the film unit, though such a box is omitted for clarity.

A film winding wheel 20 having a knurled or grooved periphery and a frame counter dial 21 are mounted above the cassette chamber. A rotary shaft of the film winding wheel 20 has a fork formed on a bottom end thereof which protrudes into the cassette chamber 11b and engages with a spool 16a of the cassette 16. Because the photographic film 17 is secured at one end to the spool 16a, the photographic film 17 is wound into the cassette 17 by rotating the film winding wheel 20 in a counter-clockwise direction.

Figure 2:
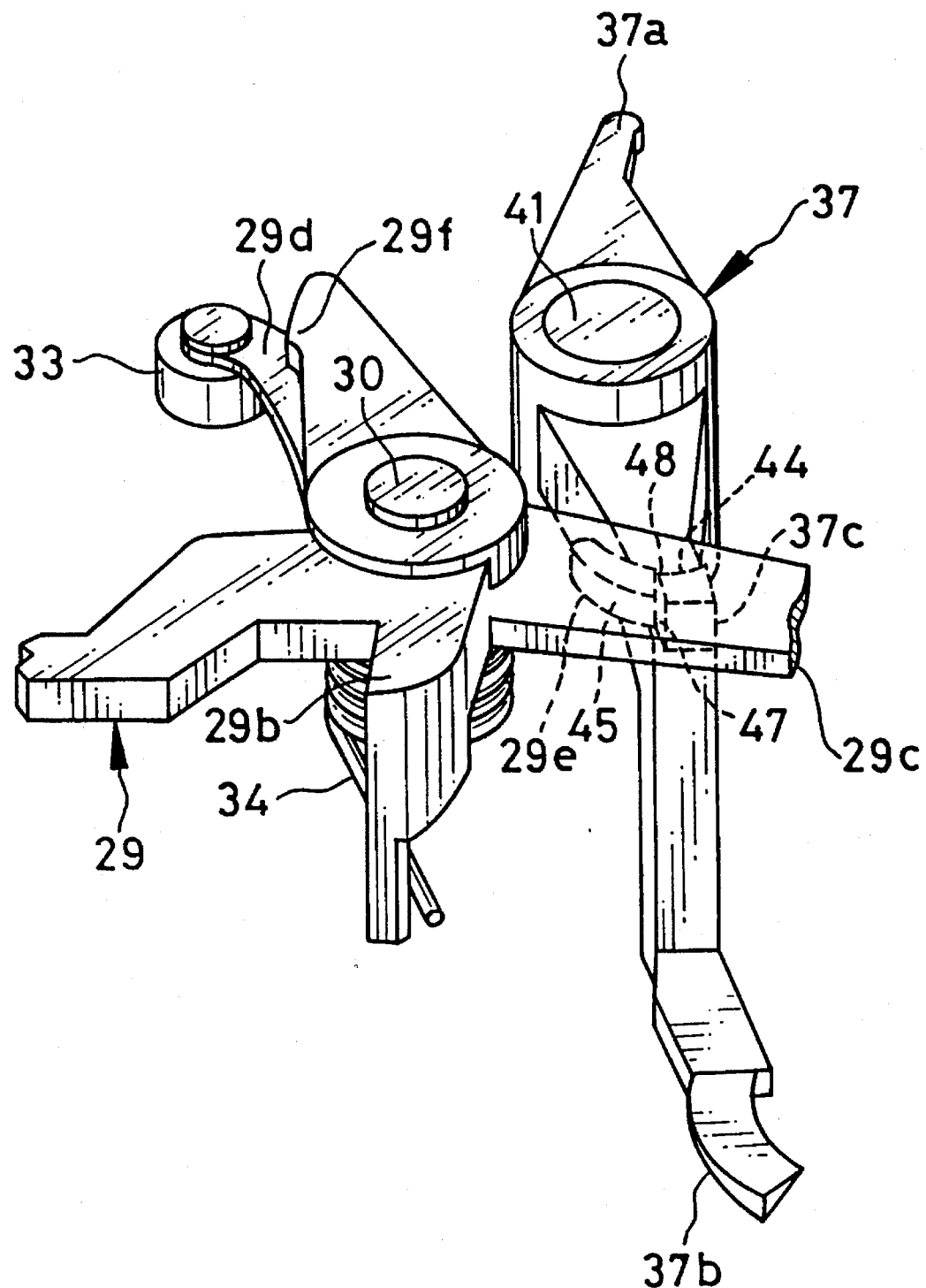
FIG. 2 is a perspective view of a frame positioning and shutter cocking mechanism according to a preferred embodiment of the invention.

A shutter blade 22 and a returning spring 23 are mounted to a front of the exposure chamber 11a, and a frame positioning and shutter cocking mechanism 24, as shown in detail in FIG. 2, is mounted to an upper portion of the exposure chamber 11a in a manner as set forth below. A shutter cover 26 covers the front of the shutter blade 22 and the returning spring 23, and a single element taking lens 27 is fitted to a lens mounting portion formed on the shutter cover 26.

The front cover 12 is attached to the front of the main body 11 having the above elements mounted, through snap-in engagement. The front cover 12 has a taking lens opening 12a and a finder objective window 12b formed through the front wall, and a shutter button 28 formed integrally with the top wall. The shutter button 28 has a release arm 28a integrally formed on the bottom side thereof.

The rear cover 13 is attached to the rear of the main body 11 through snap-in engagement, to close the interior of the main body 11 light-tightly. A curved film supporting surface 13a is formed inside the rear cover 13, to support the photographic film to be correspondingly curved behind an exposure aperture of the exposure chamber 11a. By virtue of this construction, the image formed on the photographic film 17 is prevented from being affected by the curvature of the field of the single element taking lens 27.

Figure 3:
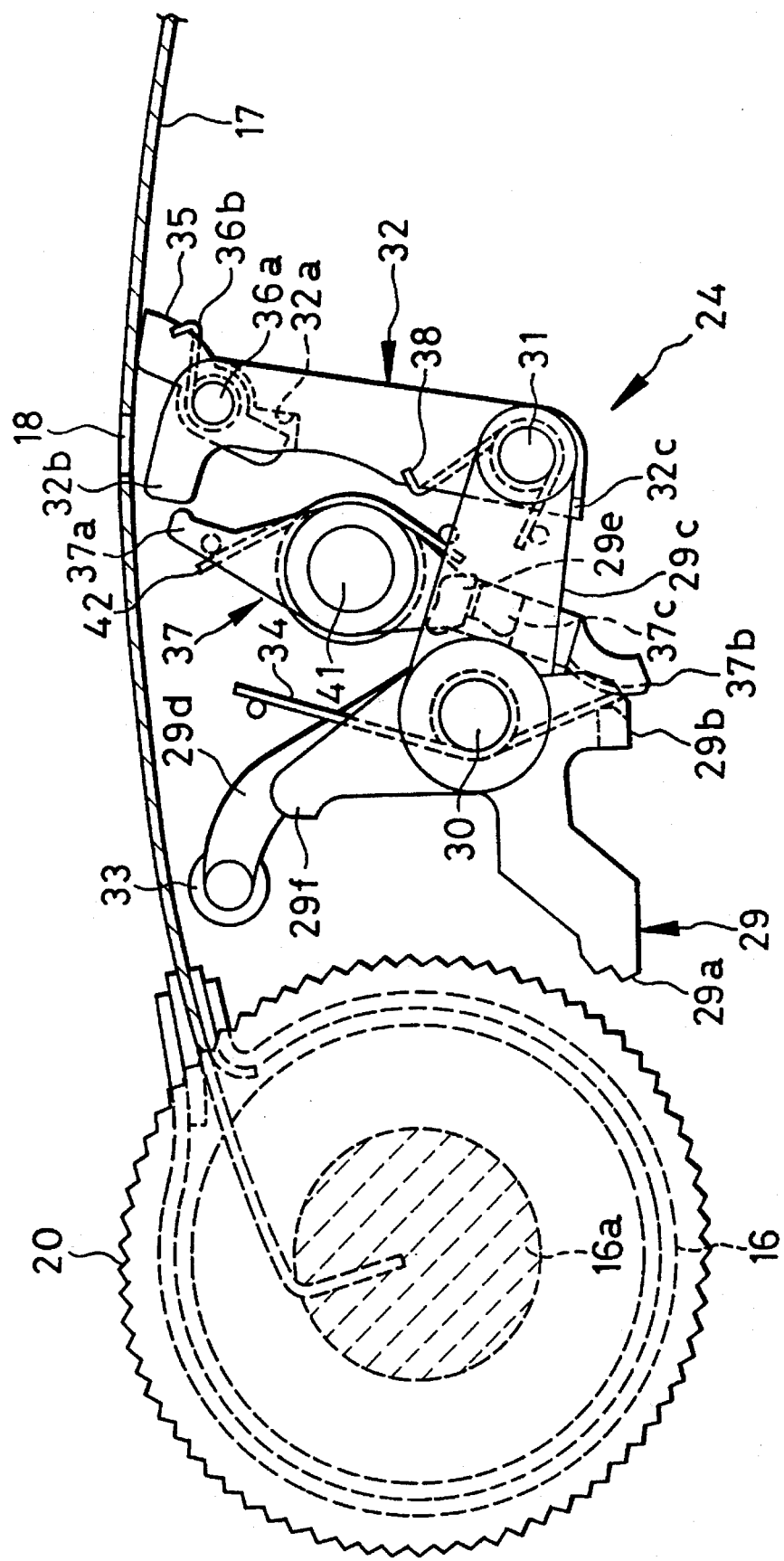
FIGS. 3 to 8 are explanatory views illustrating the operation of the frame positioning and shutter cocking mechanism shown in FIG. 2.

In FIG. 3 showing the frame positioning and shutter cocking mechanism 24 in an initial position, that is, a position immediately after the exposure and before the start of shutter cocking, an arresting lever 29 is mounted to the main body 11 near the film winding wheel 20 pivotally about a shaft 30, such that an anti-winding claw 29a of the arresting lever 29 is brought into engagement with the knurl of the film winding wheel 20 to stop winding of the photographic film 17.

Besides the anti-winding claw 29a, the film advancing lever 29 also has a release nose 29b, a connection arm 29c, a press arm 29d and a counter advancing claw 29f as an integral body. The release nose 29b is pushed by the release arm 28a when the release button 28 is depressed. The connection arm 29c is coupled to a cocking lever 32 at a distal end of the arm through a rotary shaft 31 so that the cocking lever 32 is pivotal about the rotary shaft 31. A rubber roll 33 is fixedly mounted on a distal end of the press arm 29c. The rubber roll 33 is used as a film securing member which is brought into contact with the film surface in a shutter cocked position, to stop movement of the photographic film by friction. A spring 34 mounted on the shaft 30 urges the arresting lever 29 to rotate in a clockwise direction. The counter advancing claw 29f is engaged with the frame counter dial 21 so as to advance the dial 21 in cooperation with the frame advancing.

A claw lever 35 having a 2.8 mm wide tip is pivotally mounted on a distal end position of the cocking lever 32 through a shaft 36a, and is urged by a spring 36b to rotate counter-clockwise. The tip of the claw lever 35 is disposed in a path of the perforations 18 of the photographic film 17, to be trapped in the perforation 18. The range of the counter-clockwise rotation of the claw lever 35 is limited by a relief 32a formed on the bottom surface of the cocking lever 32.

The distal end of the cocking lever 32 has a cocking nose 32b integrally formed therewith, such that the cocking nose 32b opposes to a passive arm 37a of a shutter actuating lever 37. After the tip of the claw lever 35 is trapped in the perforation 18, the cocking nose 32b pushes the passive arm 37a of the shutter actuating lever 37 along with the film advance, causing the shutter actuating lever 37 to rotate counter-clockwise. A spring 38 mounted on the shaft 31 urges the cocking lever 32 to rotate in a clockwise direction relative to the connection arm 29c, but the range of the clockwise rotation of the cocking lever is limited by a stopper 32c formed to be contact against a side edge of the connection arm 29c. So that the angle formed between the connection arm 29c and the cocking arm 32 may not goes beyond the maximum angle shown in FIG. 3.

The shutter actuating lever 37 is mounted to the main body 11 pivotally about a shaft 41, and is urged by a spring 42 to rotate clockwise. The shutter lever 37 has an active arm 37b in opposition to the passive end 37a, and a cam projection 37c is formed on a top side of the active arm 37b integrally therewith, as shown in FIG. 2. The cam projection 37c is engaged with a cam projection 29e formed on a bottom side of the connection arm 29c of the arresting lever 29.

In the initial position shown in FIG. 3, an inner surface 44 of the cam projection 37c is in contact with an outer surface 45 of the cam projection 29e, so that the arresting lever 29 is stopped from rotating in the clockwise direction. The inner surface 44 of the cam projection 37c is concave corresponding to the course of rotational movement of the shutter actuating lever 37, while the outer surface 45 of the cam projection 29e is convex corresponding to the concave inner surface 44 of the cam projection 37c. On the other hand, in the shutter cocked position, a side surface 47 of the cam projection 37c is in contact with a side surface 48 of the cam projection 29e, as is shown in FIG. 3 (see also FIG. 8), thereby preventing the shutter actuating lever 37 from rotating in the clockwise direction.

Figure 4:
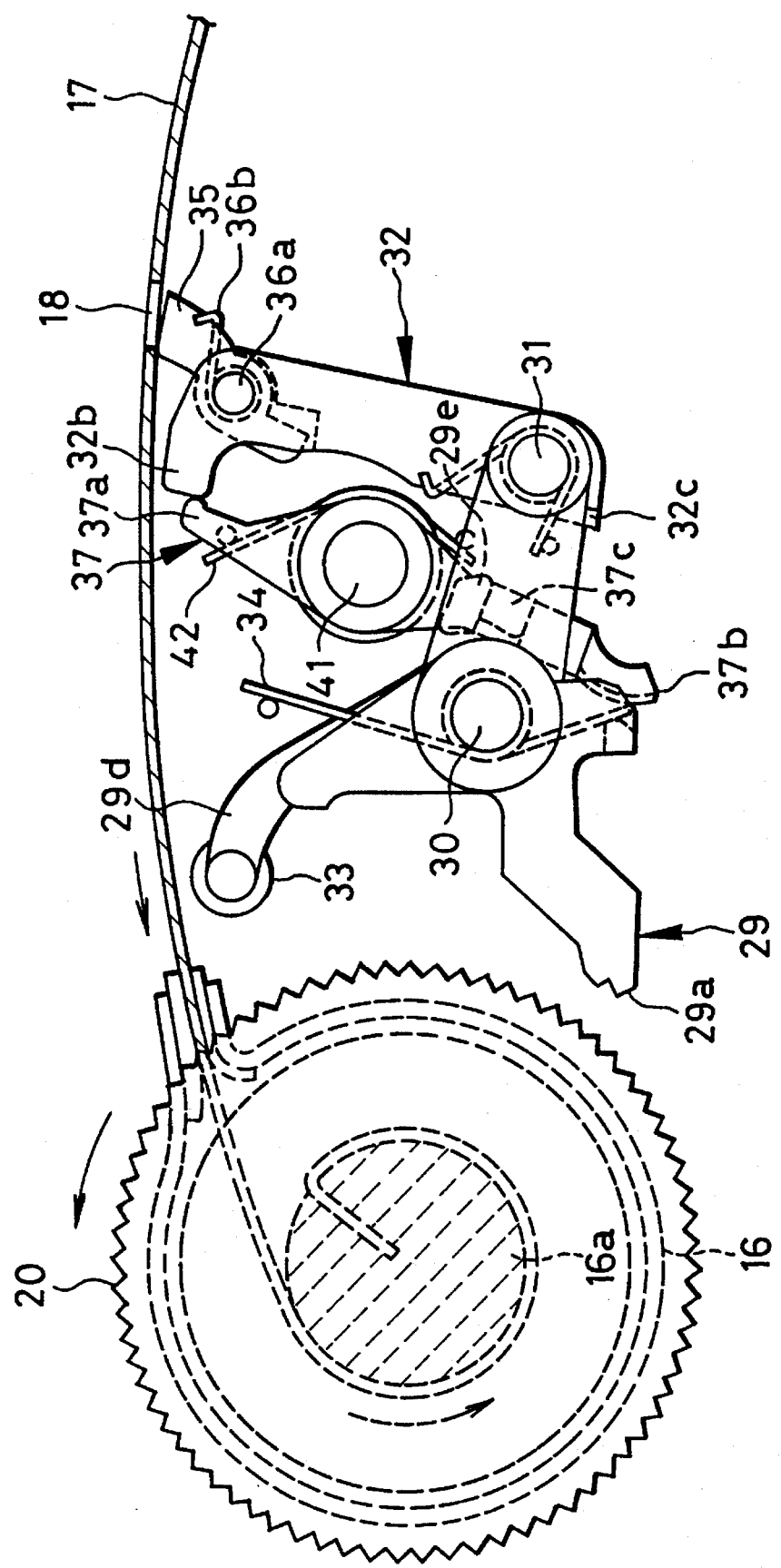

The above-described frame positioning and shutter cocking mechanism 24 operates as follows:

By rotating the film winding wheel 20 and thus the spool 16a in the counter-clockwise direction to wind the photographic film 17 into the cassette 16 from the initial position shown in FIG. 3, the photographic film 17 is advanced to the left in the drawings, as is shown in FIG. 4. In the meantime, as the tip is in contact with the sliding film surface, the claw lever 35 is rotated slightly in the clockwise direction relative to the cocking lever 32.

Figure 5:
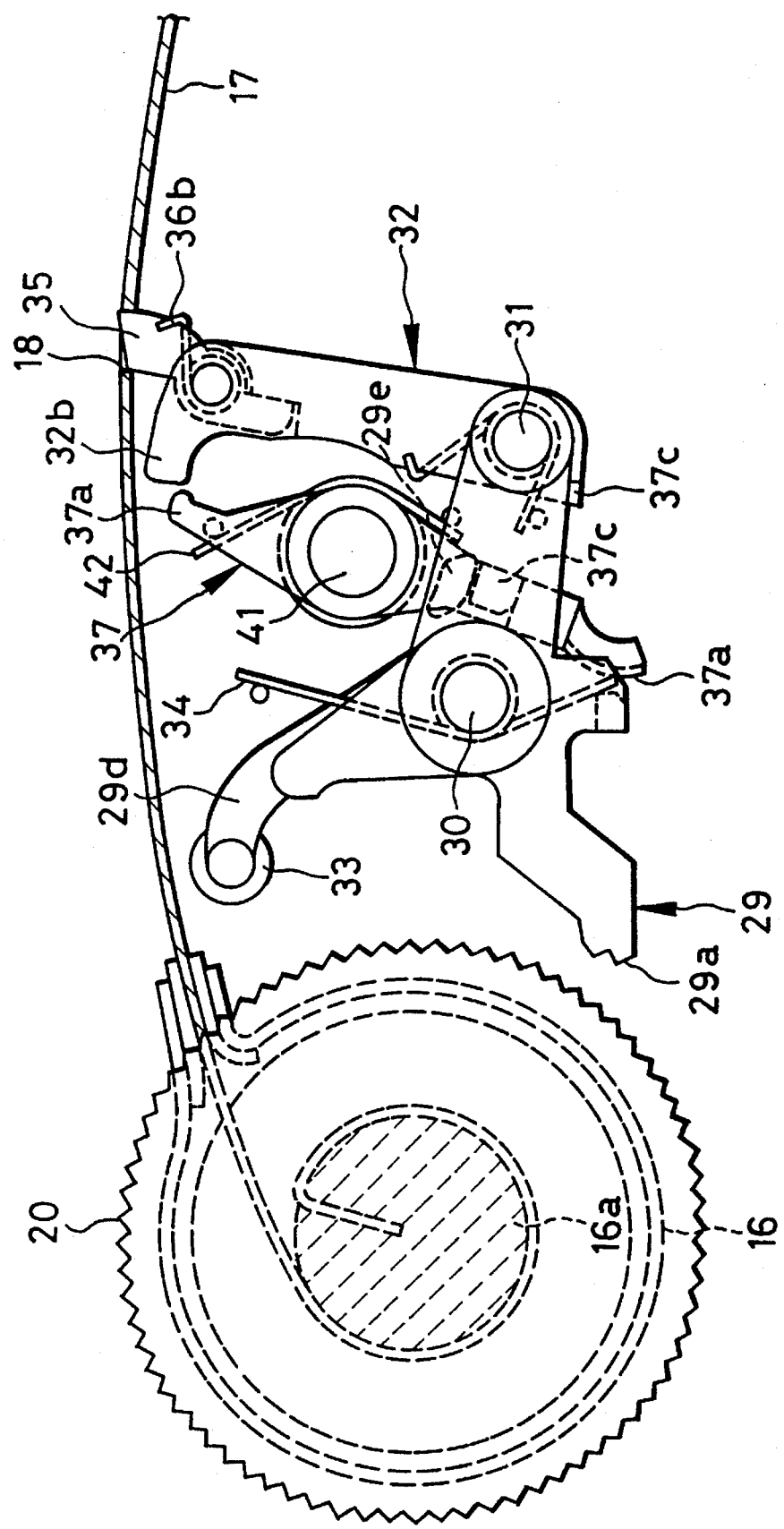
Figure 6:
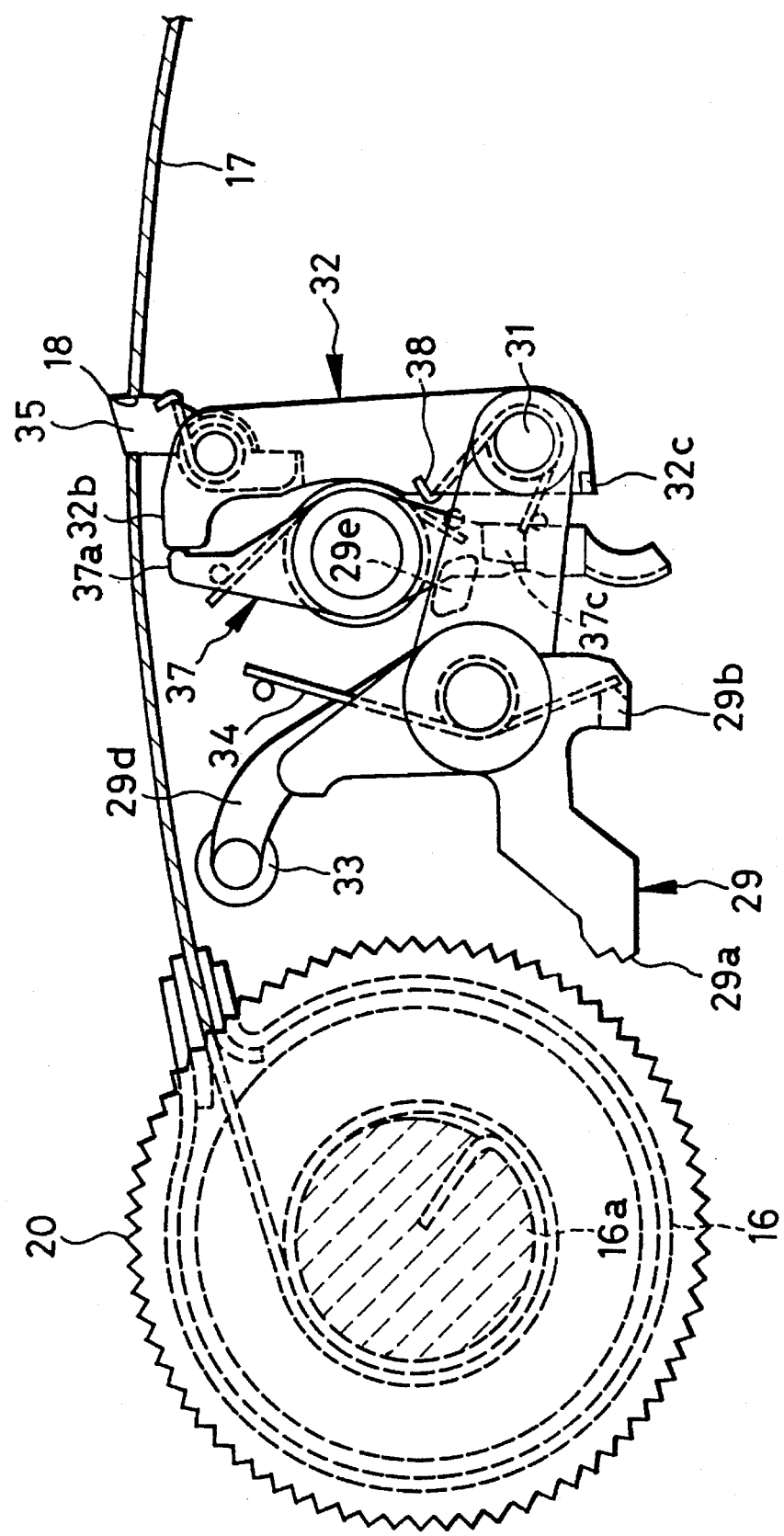

When the next perforation 18 of the photographic film 17 is moved in a position opposing to the tip of the claw lever 35 by further rotating the film winding wheel 20, the claw lever 35 rotates in the counter-clockwise direction under the force of the spring 36b to insert the tip into the perforation 18, as is shown in FIG. 5. Further rotation of the film winding wheel 20 causes the cocking lever 32 to be rotated about the shaft 31 in the counter-clockwise direction along with the film advance, as is shown in FIG. 6. As a result, the cocking nose 32b pushes the passive arm 37a to rotate the shutter actuating lever 37 in the counter-clockwise direction against the force of the spring 42. Meanwhile the inner surface 44 of the cam projection 37c slides on the outer surface 45 of the cam projection 29e.

Figure 7:
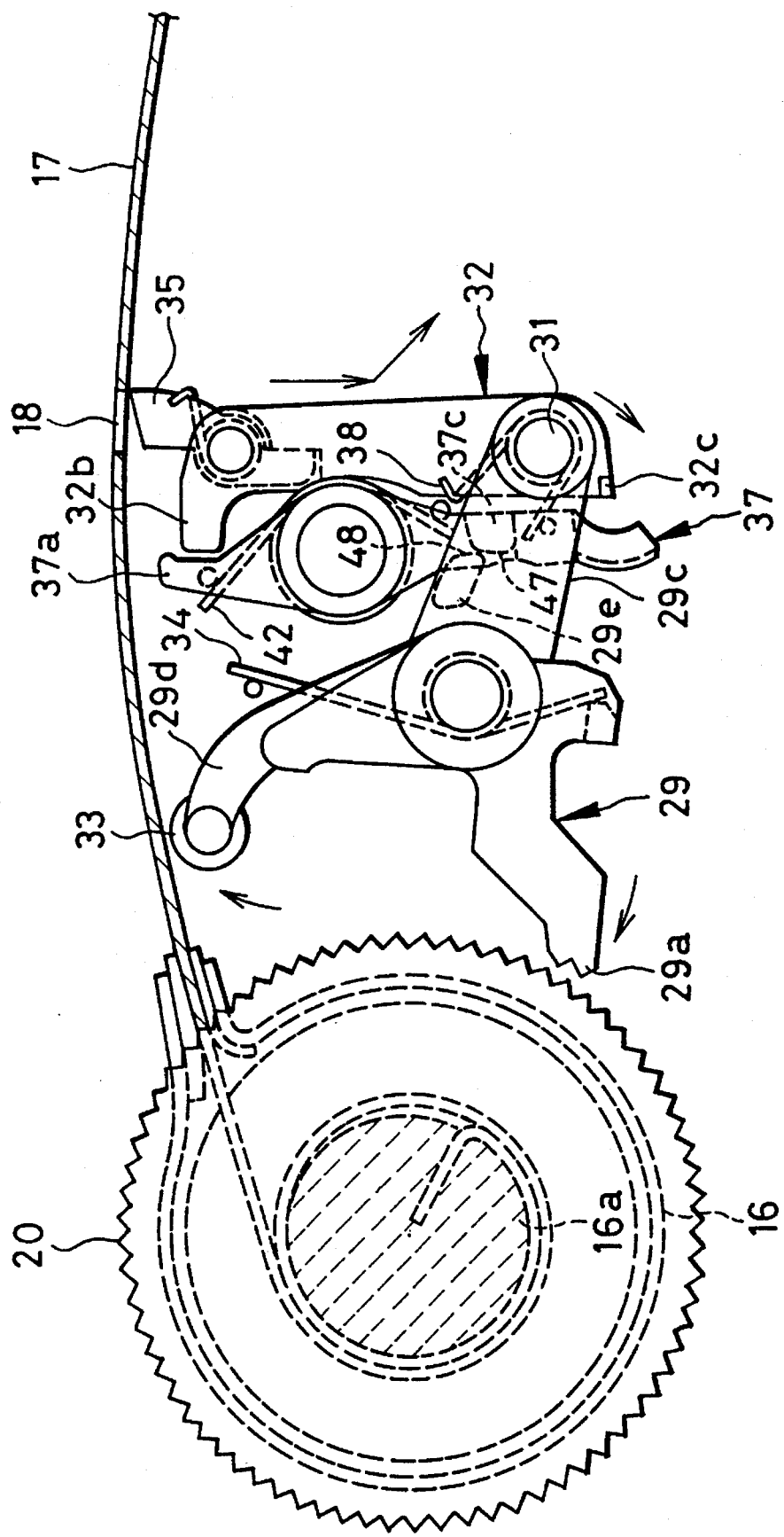

When the shutter actuating lever 37 reaches a position where the inner surface 44 of the cam projection 37c gets off the outer surface 45 of the cam projection 29e, the arresting lever 29 rotates in the clockwise direction under the force of the spring 34, as is shown in FIG. 7. As a result of the clockwise rotation of the connection arm 29c, the cocking lever 32 is removed from the photographic film 17 in a direction substantially perpendicular to the film surface. Simultaneously, the cocking nose 32b is removed from the passive arm 37a. However, because the side surface 47 of the cam projection 37c is brought into contact with the side surface 48 of the cam projection 29e as a result of the clockwise rotation of the connection arm 29c, the shutter actuating lever 37 is stopped from rotating under the force of the spring 42 in the clockwise direction. Thus, the shutter actuating lever 37 is set in the shutter cocked position.

Figure 8:
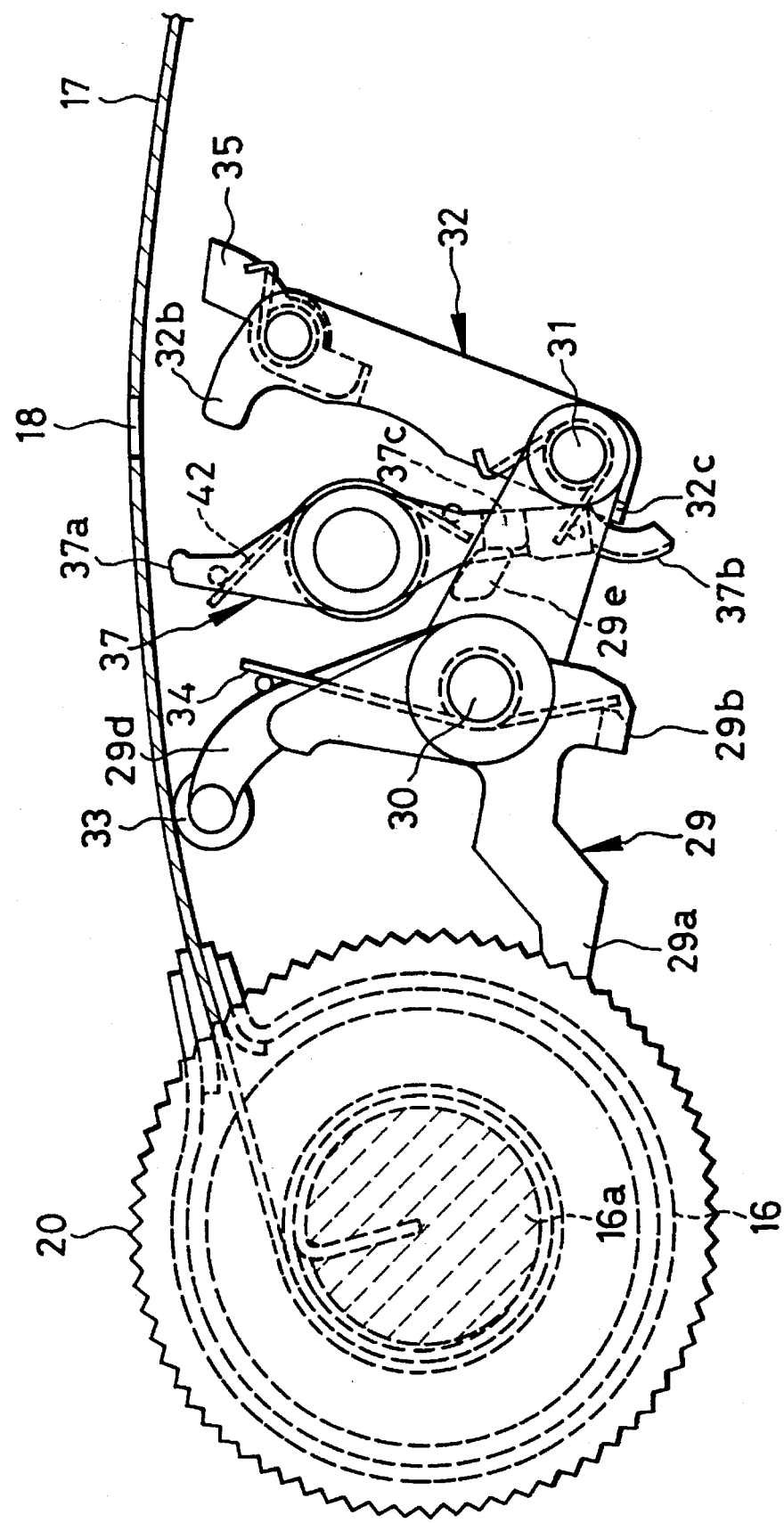

After the claw lever 35 is removed from the perforation 18, the cocking arm 32 is rotated about the shaft 31 in the clockwise direction under the force of the spring 38 until the stopper 32c contacts against the side edge of the connection arm 29c, as is shown in FIG. 8. In the cocked position shown in FIG. 8, the rubber roll 33 pressed onto the photographic film 17 as a result of the clockwise rotation of the frame advance lever 29 and its press arm 29d. Thereby, the photographic film 17 is secured immovable by the friction of the rubber roll 33. Simultaneously, the anti-winding claw 29a meshes with the groove of the film winding wheel 20 to lock the same.

When the shutter release button 28 is depressed, the release arm 28a pushes the release nose 29b of the arresting lever 29 to rotate it in the counter-clockwise direction. Thereby, the cam projection 29e is disengaged from the cam projection 37c, so that the spring 42 causes the shutter actuating lever 37 to rapidly rotates in the clockwise direction. As a result, the active arm 37b strikes the shutter blade 22 to open a stop aperture which is disposed behind the shutter blade 22. Immediately thereafter, the shutter blade 22 is returned to close the stop aperture under the force of the returning spring 23. In this way, a frame of the photographic film 17 is exposed. Because the press arm 29d is also rotated in the counter-clockwise direction along with the counter-clockwise rotation of the arresting lever 29, the rubber roll 33 is removed from the photographic film 17, so that the photographic film 17 is allowed to be advanced. Because of a curved shape of the press arm 29d, the rubber roll 33 gets off the photographic film 17 slightly after the disengagement of the cam projection 29e from the cam projection 37c, so that the photographic film 17 will not be fluttered during the exposure.

When the shutter release button 28 is returned to an initial position, the release arm 28a stops pushing the arresting lever 29, so that the arresting lever 29 is going to rotate in the clockwise direction under the force of the spring 34. However, as a result of the clockwise rotation of the shutter actuating lever 37 which has been made immediately after the shutter release, the outer surface 45 of the cam projection 29e is brought into contact with the inner surface 44 of the cam projection 37c, so that the clockwise rotation of the arresting lever 29 is prevented. Therefore, the arresting lever 29 is maintained in the initial position shown in FIG. 3, where the film winding wheel 20 is released from the lock of the anti-winding claw 29a, to permit film winding.

Next, another preferred embodiment of the invention will be described with reference to FIGS. 9 to 15.

Figure 9:
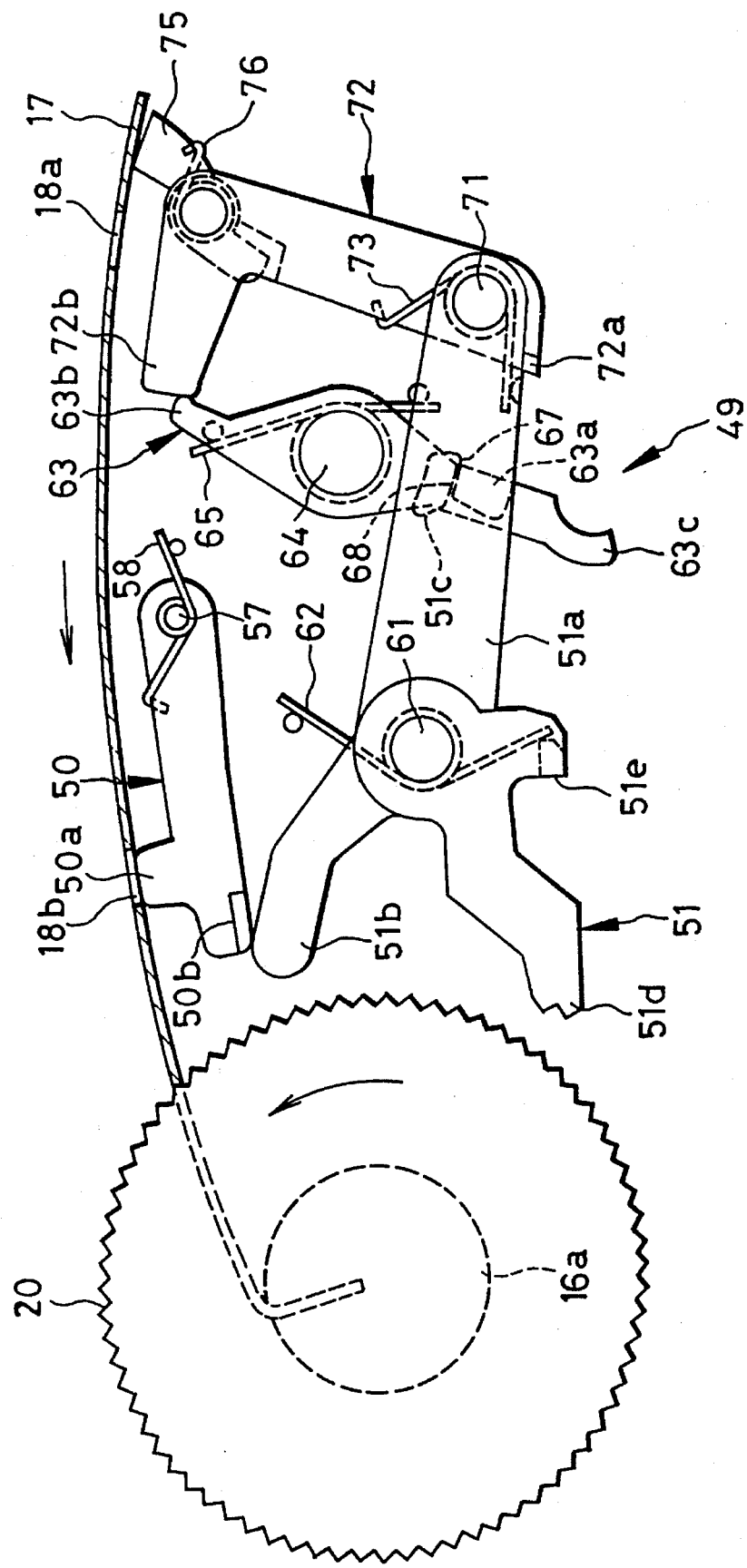
FIG. 9 is an explanatory view of a frame positioning and shutter cocking mechanism according to another preferred embodiment of the invention.
Figure 10:
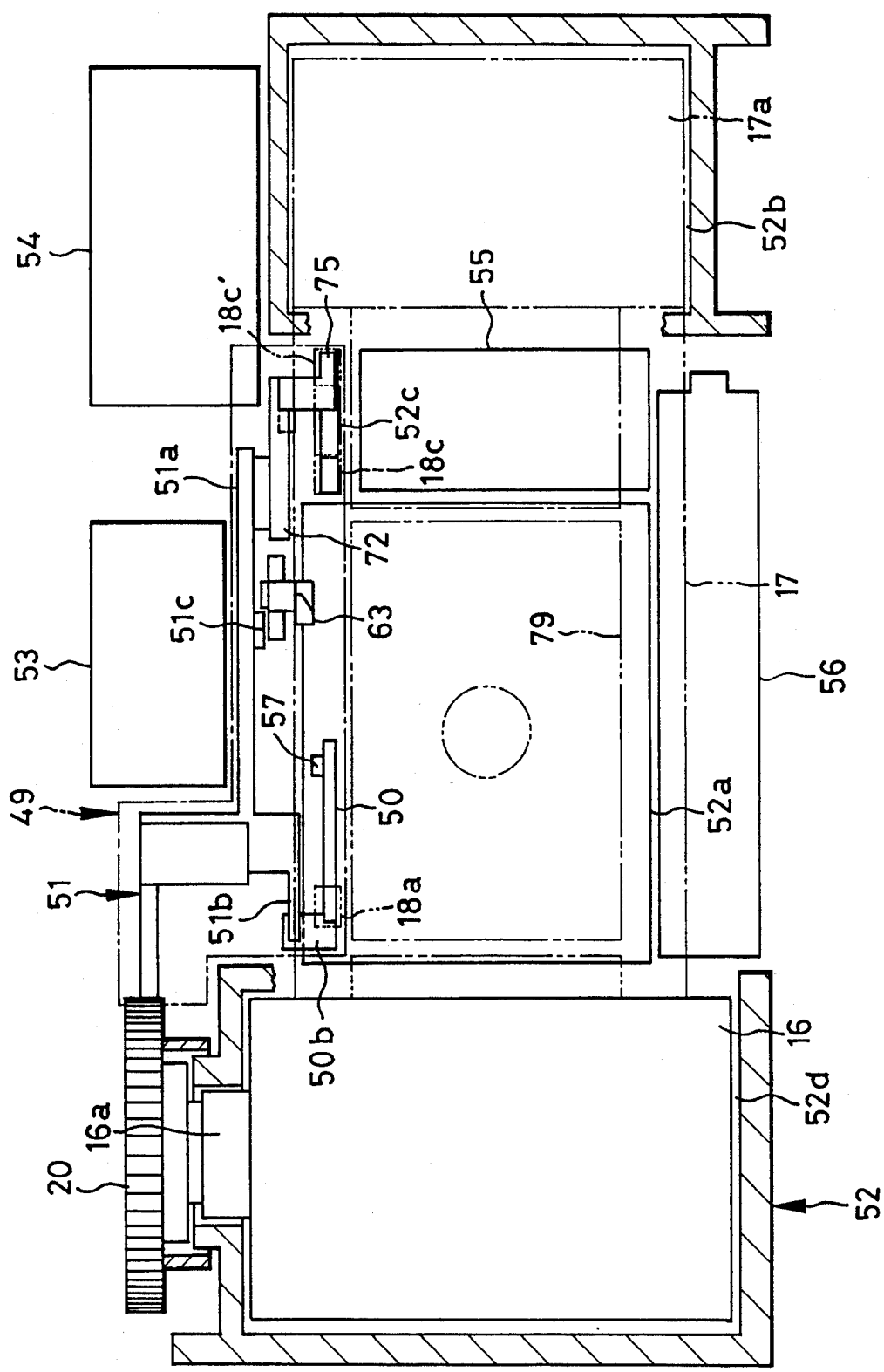
FIG. 10 is a diagram showing a layout of a camera having the frame positioning and shutter cocking mechanism of FIG. 9 mounted therein, wherein photographic film is wound into a cassette one frame after each exposure.

FIG. 9 shows an initial position, that is, a position immediately after the exposure and before the start of shutter cocking, of a frame positioning and shutter cocking mechanism 49 according to the second embodiment. The frame positioning and shutter cocking mechanism 49 uses a film securing lever 50 having an engaging projection 50a, instead of the rubber roll 33 of the first embodiment. The engaging projection 50a is arranged to be insertable into a perforation 18b of the photographic film 17 which goes just ahead a perforation 18a in which a tip of a claw lever 75 was inserted. Accordingly, compared with the first embodiment, an arresting lever 51 has an elongated connection arm 51a, and thus the frame positioning and shutter cocking mechanism 49 extends over a wider horizontal area in a film unit or a camera, as shown in FIG. 10.

The claw lever 75 is disposed between an exposure chamber 52a and a film roll chamber 52b of a main body 52. The tip of the claw lever 75 may be inserted into a film passageway through a slot 52c which is formed through the main body 52 between the exposure chamber 52a and the film roll chamber 52b. A light-trapping member such as plush ribbons are put around the slot 52c. FIG. 10 shows the second embodiment applied in a film unit with a built-in flash, wherein other reference numerals 52d, 53, 54, 55 and 56 designate a cassette chamber, a viewfinder, a flash window, a flash circuit board, and a flash charging battery, respectively.

The film securing lever 50 is mounted in the exposure chamber 52a to be pivotal about a shaft 57, and is urged by a spring 58 to a counter-clockwise direction. A vertical arm 50b is integrally formed on the top side of a distal end of the film securing lever 50, and protrudes upward from the exposure chamber 52a through a hole (not shown) formed in the top wall of the exposure chamber. A tip of the vertical arm 50b contacts a push arm 51b of the arresting lever 51, so that the rotational position of the film securing lever 50 is restricted by the rotational position of the arresting lever 51. Also the hole for the vertical arm 50b is provided with a light trapping member such as plush ribbons therearound. The arresting lever 51 is pivotally mounted on a shaft 61, and is urged by a spring 62 to a clockwise direction. A shutter actuating lever 63 is pivotally mounted on a shaft 64, and is urged by a spring 65 to a clockwise direction. In the second embodiment, a counter advancing claw is omitted for clarity.

In the initial position shown in FIG. 9, the clockwise rotation of the arresting lever 51 is hindered by an engagement between an outer surface 67 of a cam projection 51c formed on the bottom side of the connection arm 51a and an inner surface 68 of a cam projection 63a of the shutter actuating lever 63. At a distal end of the connection arm 51a, a cocking lever 72 is coupled to be pivotal about a shaft 71, and is urged by a spring 73 to rotate in a clockwise direction relative to the connection arm 51a. The range of the clockwise rotation of the cocking lever is limited by a stopper 72c, so that the angle formed between the connection arm 51a and the cocking arm 72 may not goes beyond the maximum angle shown in FIG. 9. The claw lever 75 is pivotally mounted on a distal end position of the cocking lever 72, and is urged by a spring 76 to rotate counter-clockwise, so that the tip of the claw lever 75 is pushed onto the photographic film 17. The distal end of the cocking lever 72 has a cocking nose 72b integrally formed therewith, which pushes a passive arm 63b of the shutter actuating lever 63 toward a cocked position.

Figure 11:
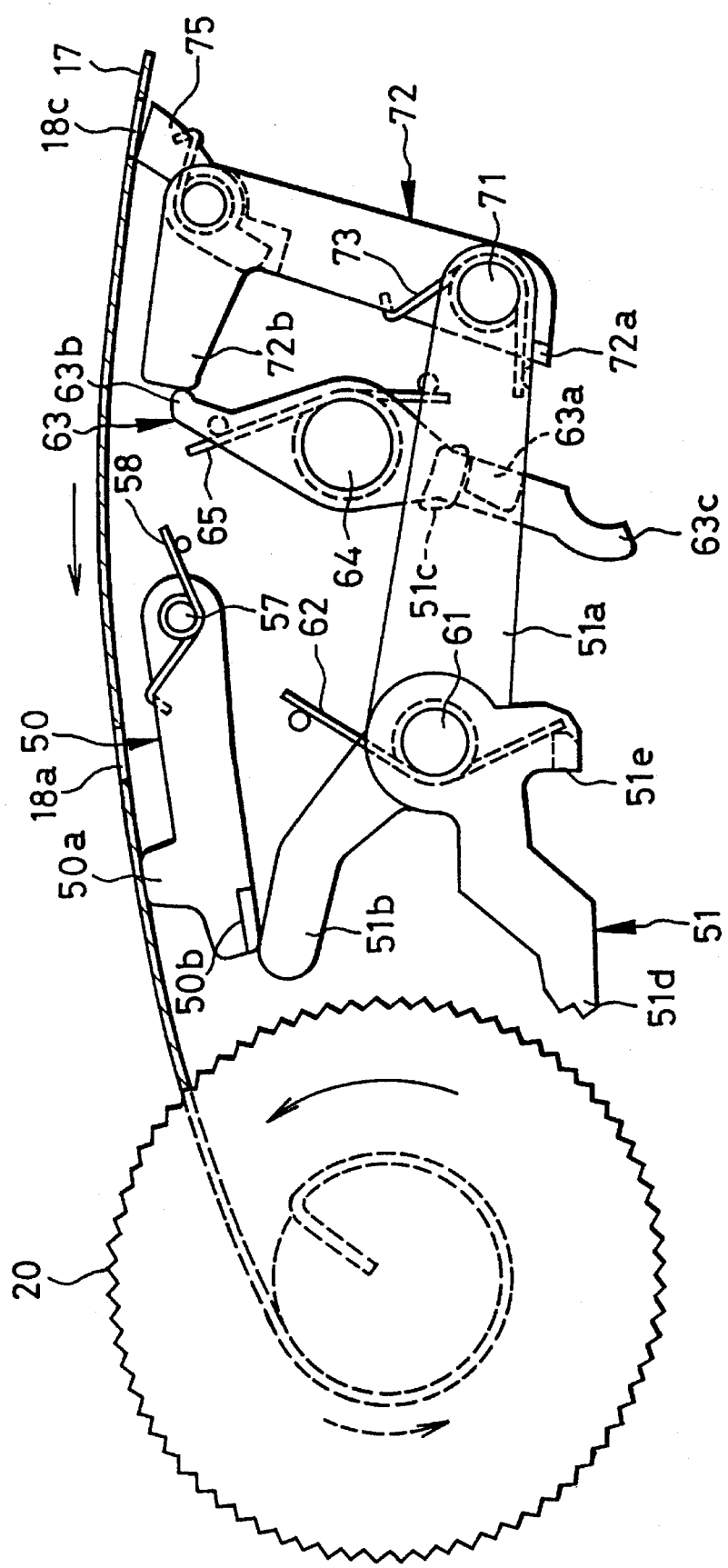
FIGS. 11 to 14 are explanatory views illustrating the operation of the frame positioning and shutter cocking mechanism shown in FIG. 9.
Figure 12:
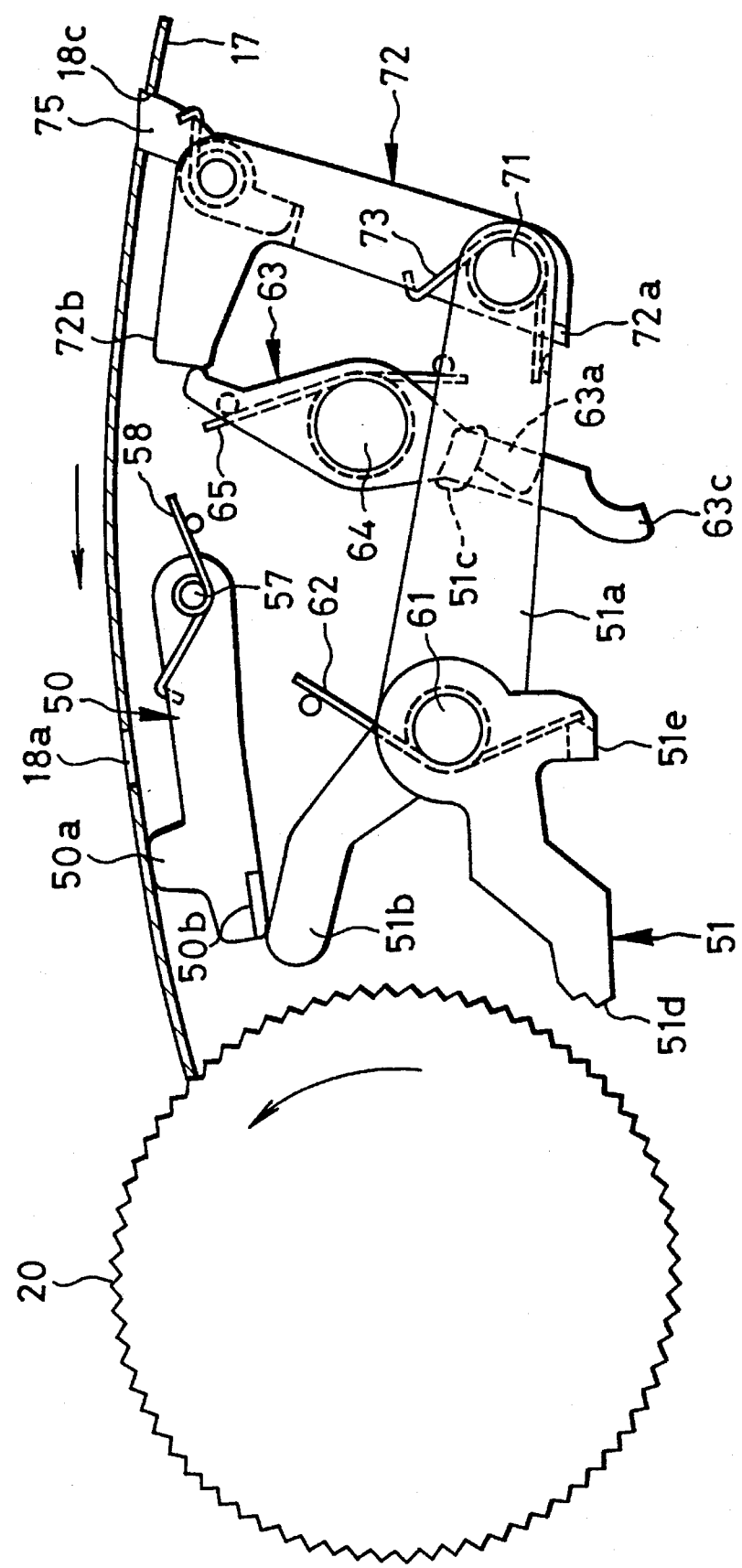
Figure 13:
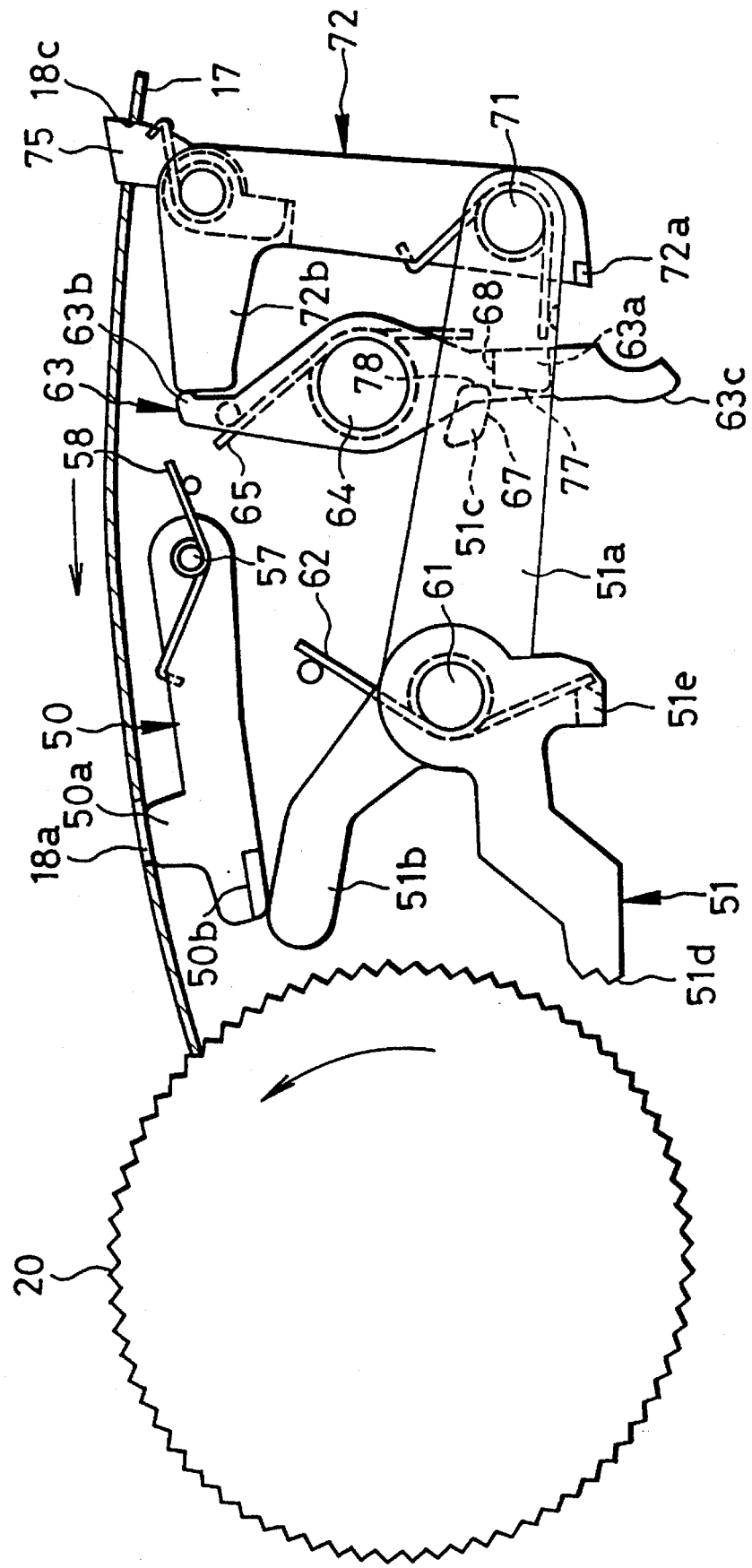

When the photographic film 17 is advanced by rotating a film winding wheel 20 to wind up the photographic film 17 onto a spool 16a of a cassette 16, the tip of the claw lever 75 slides on the film surface. When a perforation 18c next to the perforation 18a reaches a position opposing to the tip of the claw lever 75, as shown in FIG. 11, the tip of the claw lever 75 is engaged into the perforation 18c, as is shown in FIG. 12. After the tip of the claw lever 75 is engaged in the perforation 18c, the cocking lever 72 is rotated counter-clockwise along with the film advance, so that the cocking nose 72b pushes the passive arm 63b, causing the shutter actuating lever 63 to rotate counter-clockwise, as is shown in FIG. 13. As a result, the outer surface 67 of the cam projection 63a is disengaged from the inner surface 68 of the cam projection 51c, causing the arresting lever 51 to rotate clockwise under the forth of the spring 62, as is shown in FIG. 14.

Thereby, the claw lever 75 is disengaged from the perforation 18c, and the cocking lever 72 is rotated in the clockwise direction. Simultaneously, the film securing lever 50 is pushed by the push arm 51b of the arresting lever 51. Thereby the engaging projection 50a is inserted in the perforation 18a preceding to the perforation 18c, stopping the movement of the photographic film 17. Also the film winding wheel 20 is locked at that time through an engagement of an anti-winding claw 51d of the arresting lever 51 with grooves of the film winding wheel 20. Concurrently, a side surface 77 of the cam projection 63a is brought into contact with a side surface 78 of the cam projection 51c, thereby locking the shutter actuating lever 63 in a cocked position shown in FIG. 14.

Figure 14:
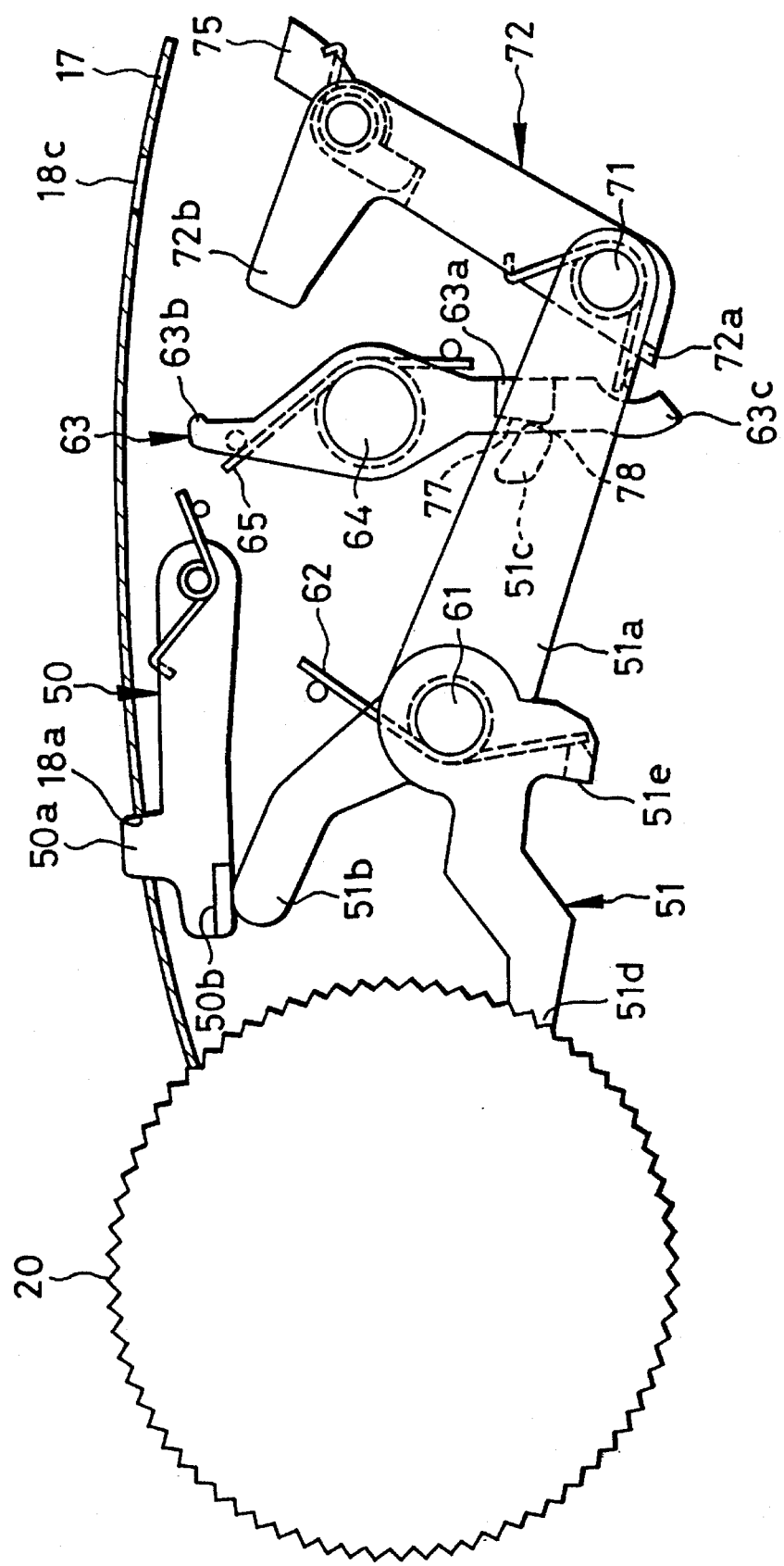

It is to be noted that FIG. 10 shows the cocked position corresponding FIG. 14, and the position of the perforation 18c shown in FIG. 10 also corresponds to that shown in FIG. 14 or 13, but a perforation 18c' indicates a position of the perforation 18c corresponding to that shown in FIG. 12. That is, the shutter cocking is performed while the perforation 18c is moved along with the photographic film 17 from the position designated by 18c' to the position designated by 18c.

When a shutter release button is depressed, a release arm protruding downward from the shutter release button pushes a release nose 51e of the arresting lever 51 to rotate the lever 51 in a counter-clockwise direction, thereby to disengage the cam projection 51c from the cam projection 63a. In this moment, the shutter actuating lever 63 is rapidly rotated clockwise under the force of the spring 65, so that an active arm 63c of the shutter actuating lever 63 strikes a shutter blade which is pivotally mounted to the front of the exposure chamber 52a. Thereby, a frame of the photographic film 17 disposed behind an exposure aperture 79 is exposed.

Along with the counter-clockwise rotation of the arresting lever 51, the film securing lever 50 is rotated counter-clockwise, so that the engaging projection 50a is removed from the perforation 18a. Because the radial distance of the contacting position of the push arm 51b with the vertical arm 50b from the shaft 61 is less than the radial distance of the side surface 78 of the cam projection 51c from the shaft 61, the removal of the engaging projection 50a from the perforation 18a is performed slightly after the disengagement of the cam projection 51c from the cam projection 63a. Therefore, the photographic film 17 will not vibrate or flutter at the moment of the exposure. The other operations are similar to the first embodiment, so that the description thereof is omitted.

As shown in FIG. 15, the frame positioning and shutter cocking mechanism 49 is applicable to a camera 80 which is provided with a film take-up chamber 82 having a take-up spool 81 in place of the cassette chamber 52d, and a film supply chamber 83 in place of the film roll chamber 52b. The claw lever 75 is disposed between the film supply chamber 83 and an exposure chamber 86, and a tip of the claw lever 75 may protrude into a film passageway through a slot 85 with light trapping plush ribbons or the like.

After each exposure, a film winding wheel 20 is rotated to wind up an exposed frame 89 around the take-up spool 81 and withdraw an unexposed frame from a cassette 88 loaded in the film supply chamber 83. The unexposed frame is positioned behind an exposure aperture 89 by virtue of the film securing lever 50 whose engaging projection 50a is engaged in a perforation 90a allocated to the unexposed frame, in cooperation between the arresting lever 51. Along with this one-frame advance of the photographic film 87, the claw lever 75 is engaged in a perforation 90b which is allocated to a next unexposed frame, so that the shutter actuating lever 63 is cocked in the same way as above. FIG. 15 shows the cocked position. Other elements may be equivalent to those designated by the same reference numerals in FIG. 10, so that the description thereof is omitted.

In alternative, it is possible to dispose a frame positioning and shutter cocking mechanism in a space provided between an exposure chamber and a film take-up chamber in either type of camera where the film take-up chamber holds a cassette for winding up a photographic film into the cassette after each exposure, or the film take-up chamber has a take-up spool for winding up a photographic film from a cassette after each exposure.

Although the perforation 18 of the photographic film 17 is 3 mm long and the tip of the claw lever 35 is 2.8 mm wide in the film transporting direction in the first embodiment, it is possible to determine the width of the tip 1.8 mm and the length of the perforation 2 mm. That is, the size of the claw lever should be adjusted to the size of the perforation of the photographic film.

When embodying the present invention in two types of film units containing different types of photographic films from each other, it is preferable to predetermine the different type photographic films to have different size perforation from each other, while providing the different type film units with different size claw lever from each other in correspondence with the size of the associated perforation. Thereby, loading of one type photographic film in the other type film unit can be prevented.

For example, when one type film unit is designated to contain ISO-800 film and so attached with a taking lens having a f-number f/16, while the other type film unit is designated to contain ISO-400 film and so attached with a taking lens having a f-number f/11, ISO-800 film may be useful in both types of film units, but ISO-400 film would be under-exposed through the f/16 taking lens. Therefore, it is necessary to avoid loading ISO-400 film in the film unit for ISO-800 film. To avoid such a trouble, it is preferable to make ISO-800 film have, e.g., 3 mm long perforations, and ISO-400 film have 2 mm long perforations, while determining the width of the tip of the claw lever 2.8 mm for the film unit having the f/16 taking lens and 1.8 mm for the film unit having the f/11 taking lens. Thereby, even if the ISO-400 film is loaded in the film unit for ISO-800 film by mistake, because the 2.8 mm wide claw lever cannot engage in the 2 mm long perforation of the ISO-400 film, the shutter will not be cocked nor released. Accordingly, the mistake would be found at once.

Also when one type film unit is designated to contain 36-exposure film, and the other type film unit is designated to contain 39-exposure film, if 36-exposure film should be loaded in the 39-exposure film unit having a corresponding 39-count frame counter dial, a problem would arise that the photographer takes the 37th to 39th pictures in vain. In case 39-exposure film is loaded in the 36-exposure film unit, the 37th to 39th frames would be left unexposed. However, the former case can be a greater problem than the later.

To avoid the former case, 39-exposure film may have 3 mm long perforations, and 36-exposure film may have 2 mm long perforations, while the width of the tip of the claw lever is determined 2.8 mm for the 39-exposure film unit and 1.8 mm for the 36-exposure film unit. Thereby, even if the 36-exposure film is loaded in the 39-exposure film unit by mistake, because the 2.8 mm wide claw lever cannot engage in the 2 mm long perforation of the 36-exposure film, the shutter will not be cocked nor released. Accordingly, the mistake would be found at once.

In the second and third embodiments, the size of the engaging projection 50a of the film securing lever 50 is preferably determined to fit in the perforations of a designated type photographic film, so that another type photographic film having a smaller perforation cannot activate the frame positioning and shutter cocking mechanism.

While the above-described embodiments have been used in combination with such photographic film that has a single perforation per frame, the present invention may be used with such photographic film that has two perforation per frame. To such type photographic film where the two perforation are arranged on opposite lateral sides of each frame, any of the above-described embodiments may be directly applicable. To such type photographic film where the two perforation are aligned on one side of each frame, a claw lever may have a forked tip which may be engaged in adjacent two of the perforations.

The photographic film for use with the present invention may have smaller perforations other than the perforation for cocking and positioning, such tat the tip of the claw lever or the engaging projection cannot be engaged in the smaller perforations. The smaller perforations may represent film data such as film speed.

Although the slots for the claw lever 75 and the vertical arm 50b of the second and third embodiments are provided with light-trapping members, it is unnecessary to provide he light-trapping members if the main body is closed by the front cover in light-tight fashion.

Thus, the present invention should not be limited to the above-described embodiments but, on the contrary, various modifications of the present invention may be possible without departing from the scope and spirit of the appended claims.

What is claimed is:

1. A mechanism for cocking a shutter actuating lever for actuating a shutter blade, in cooperation with advancing of a photographic film by one-frame amount by rotating a film winding wheel, said photographic film having one or two perforations for engagement with said mechanism in association with each frame, said mechanism comprising:

an arresting member, pivotally mounted on a fixed shaft, for arresting said shutter actuating lever in a cocked position and simultaneously stopping said film winding wheel from rotating;

a lever member pivotally mounted on said arresting member;

a claw member pivotally mounted on a distal end portion of said lever member, said claw member being contacted with said photographic film during the film advancing, so as to be engaged in one of said perforations and moved along with said photographic film, thereby causing said lever member to rotate in a film advancing direction and push said shutter actuating lever toward the cocked position; and a first and a second means, respectively mounted between the arresting member and the lever member and between the lever member and the claw member, for controlling respectively the angle formed between the arresting member and the lever member and between the lever member and the claw member; and wherein when said shutter actuating lever reaches the cocked position, said arresting member is rotated to arrest said shutter actuating lever in the cocked position and mesh with said film winding wheel to stop said film winding wheel from rotating, and said rotation of said shutter actuating lever causes said claw member to disengage from said perforation through said lever member.

2. A mechanism as claimed in claim 1, further comprising a film securing member for preventing movement of said photographic film after said shutter actuating lever is arrested in the cocked position and said claw member is disengaged from said perforation, said film securing member cooperating with said arresting member such that said film securing member is rotated toward said photographic film when said arresting member is rotated to arrest said shutter actuating lever in the cocked position.

3. A mechanism as claimed in claim 2, wherein said film securing member removes from said photographic film immediately after said shutter actuating lever is released to actuate said shutter blade.

4. A mechanism as claimed in claim 3, wherein said film securing member is brought into contact with a surface of said photographic film to secure said photographic film by friction.

5. A mechanism as claimed in claim 4, wherein said film securing member is a rubber roll fixedly secured to a distal end of said arresting member.

6. A mechanism as claimed in claim 3, wherein said film securing member has a projection and is pushed by an end of said arresting lever when said arresting lever is rotated to arrest said shutter actuating lever, thereby to bring said projection into engagement with another one of said perforations which is adjacent to said perforation which was just engaged with said claw member.

7. A mechanism as claimed in claim 6, wherein said mechanism is mounted in a lens-fitted photographic film unit having a film roll chamber as a film supply chamber and a cassette chamber as a film take-up chamber which are disposed on opposite sides of an exposure chamber, said film roll chamber holding a roll of said photographic film whose end is secured to a take-up spool of a cassette held in said cassette chamber and which is wound into said cassette one-frame amount after each frame is exposed in said exposure chamber, and wherein said claw member is engaged with said perforation in a portion between said film roll chamber and said exposure chamber.

8. A mechanism as claimed in claim 7, wherein said film securing member is engaged with a perforation which is associated with a frame to be positioned in said exposure chamber.

9. A mechanism as claimed in claim 6, wherein said mechanism is mounted in a camera having a cassette chamber as a film supply chamber and a film take-up chamber for winding up said photographic film from a cassette held in said cassette chamber, one-frame amount after each frame is exposed in an exposure chamber disposed between said chambers, and wherein said claw member is engaged with said perforation in a portion between said cassette chamber and said exposure chamber.

10. A mechanism as claimed in claim 9, wherein said film securing member is engaged with a perforation which is associated with a frame to be positioned in said exposure chamber.

11. A mechanism for cocking a shutter actuating lever against a biasing force, to get ready for actuating a shutter blade, while advancing a photographic film by one-frame amount by rotating a film winding wheel, said photographic film having one or two perforations per frame for engagement with said mechanism, said mechanism comprising:

a first lever member biased toward an anti-winding position where said first lever member is engaged with said film winding wheel to stop advancing said photographic film, and rotatable into a winding position where said first lever member is disengaged from said film winding wheel to permit advancing said photographic film;

a second lever member coupled to a distal end of said first lever member to be pivotal within a range relative to said first lever member in a plane perpendicular to said photographic film;

a claw member coupled to a distal end of said second lever member and pivotal within a range relative to said second lever member in a plane perpendicular to said photographic film, said claw member being in contact with said photographic film to be engageable in one of said perforations when said first lever member is in said winding position;

a cocking portion formed on said distal end of said second lever, said cocking portion pushing said shutter actuating lever toward said cocked position when said second lever is pivotally moved along with the advance of said photographic film after said claw member is engaged with said perforation; and an interlocking member for interlocking said first lever member with said shutter actuating lever such that when said shutter actuating lever reaches said cocked position said first lever member rotates into said anti-winding position, thereby arresting said shutter actuating lever in said cocked position and, simultaneously, causing said claw member to remove from said perforation through said second lever member, and when said first lever member is rotated from said anti-winding position to said winding position, said shutter actuating lever is released from said first lever member to rotate from said cocked position back to an initial position, thereby arresting said first lever member in said winding position.

12. A mechanism as claimed in claim 11, further comprising a film securing member which is rotated with said first lever member to be brought into contact or engagement with said photographic film in said anti-winding position of said first lever member.

\* \* \* \* \*